United States Patent
Hayashi (10) Patent No.: US 9,614,990 B2
(45) Date of Patent: Apr. 4, 2017

(54) IMAGE PROCESSING DEVICE AND IMAGE PROCESSING METHOD FOR DETERMINING CHARACTER DATA FROM IMAGE DATA BASED ON MISRECOGNITION CHARACTER DATA AND OUTPUTTING CHARACTER DATA IN ACCOMPANIMENT TO IMAGE DATA

(71) Applicant: KYOCERA Document Solutions Inc., Osaka (JP)

(72) Inventor: Hironori Hayashi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/808,158

(22) Filed: Jul. 24, 2015

(65) Prior Publication Data
US 2016/0034774 A1   Feb. 4, 2016

(30) Foreign Application Priority Data
Jul. 30, 2014   (JP) ................. 2014-154685

(51) Int. Cl.
G06K 9/68   (2006.01)
H04N 1/00   (2006.01)
G06K 9/03   (2006.01)

(52) U.S. Cl.
CPC ......... *H04N 1/00798* (2013.01); *G06K 9/03* (2013.01); *G06K 9/6828* (2013.01); *G06K 2209/01* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,198,846 B1* | 3/2001 | Nishiwaki | G06K 9/344 382/178 |
| 6,341,176 B1* | 1/2002 | Shirasaki | G06K 9/72 382/229 |
| 9,349,202 B1* | 5/2016 | Manohar | G06T 11/60 |
| 2009/0256852 A1* | 10/2009 | Sakurai | G09G 5/225 345/557 |

FOREIGN PATENT DOCUMENTS

JP   2006-252430 A   9/2006

* cited by examiner

*Primary Examiner* — Siamak Harandi
*Assistant Examiner* — Mai Tran
(74) *Attorney, Agent, or Firm* — Studebaker & Brackett PC (57) ABSTRACT

A font recognition section recognizes a font of characters depicted by character image data included in image data upon first character data corresponding to the character image data being acquired through character recognition. A font character recognition section compares the character image data to font character image data depicting characters in the recognized font and acquires second character data corresponding to font character image data when the font character image data matches the character image data. A recognized character determination section determines whether or not the first character data matches the second character data, and when determining that the first character data does not match the second character data, adopts the second character data, instead of the first character data, as recognized character data for the character image data.

3 Claims, 5 Drawing Sheets

IMAGE PROCESSING DEVICE AND IMAGE PROCESSING METHOD FOR DETERMINING CHARACTER DATA FROM IMAGE DATA BASED ON MISRECOGNITION CHARACTER DATA AND OUTPUTTING CHARACTER DATA IN ACCOMPANIMENT TO IMAGE DATA

INCORPORATION BY REFERENCE

The present application claims priority under 35 U.S.C. §119 to Japanese Patent Application No. 2014-154685, filed Jul. 30, 2014. The contents of this application are incorporated herein by reference in their entirety.

BACKGROUND

The present disclosure relates to image processing devices and image processing methods.

In recent years, image processing devices such as copiers and multifunction peripherals that perform optical reading of characters such as handwritten characters or printed characters in printed matter have become commonly known. In one example, an image processing device has an optical character recognition (OCR) function of identifying character data by comparing character image data acquired through reading to pre-registered character patterns. An image processing device such as described above for example uses an image reading function and then uses an OCR function to recognize character strings from character strings handwritten by a user and automatically create a font corresponding to the character strings.

SUMMARY

An image processing device according to one aspect of the present disclosure includes a font recognition section, a font character recognition section, and a recognized character determination section. The font recognition section recognizes a font of characters depicted by character image data included in image data upon first character data corresponding to the character image data being acquired through character recognition. The font character recognition section compares the character image data to font character image data depicting characters in the recognized font and acquires second character data corresponding to the font character image data when the font character image data matches the character image data. The recognized character determination section determines whether or not the first character data matches the second character data. When determining that the first character data does not match the second character data, the recognized character determination section adopts the second character data, instead of the first character data, as recognized character data for the character image data.

An image processing method according to one aspect of the present disclosure includes implementation by a processor of recognizing a font of characters depicted by character image data included in image data upon first character data corresponding to the character image data being acquired through character recognition. The image processing method also includes implementation by the processor of comparing the character image data to font character image data depicting characters in the recognized font and acquiring second character data corresponding to the font character image data when the font character image data matches the character image data. The image processing method also includes implementation by the processor of determining whether or not the first character data matches the second character data, and when determining that the first character data does not match the second character data, adopting the second character data, instead of the first character data, as recognized character data for the character image data.

DETAILED DESCRIPTION

In order to facilitate understanding of the present disclosure, the following explains an image processing device and an image processing method according to an embodiment of the present disclosure with reference to the accompanying drawings. The embodiment described below is a specific example of the present disclosure and does not in any way limit the technical scope of the present disclosure. Note that the letter S indicated before numbers in the flowchart is used to denote a step.

The following explains an image processing device as an example of an embodiment of the present disclosure. The image processing device according to the present disclosure is for example a multifunction peripheral (MFP) that functions as a facsimile machine, a copier, a scanner, and a printer.

Figure 1:
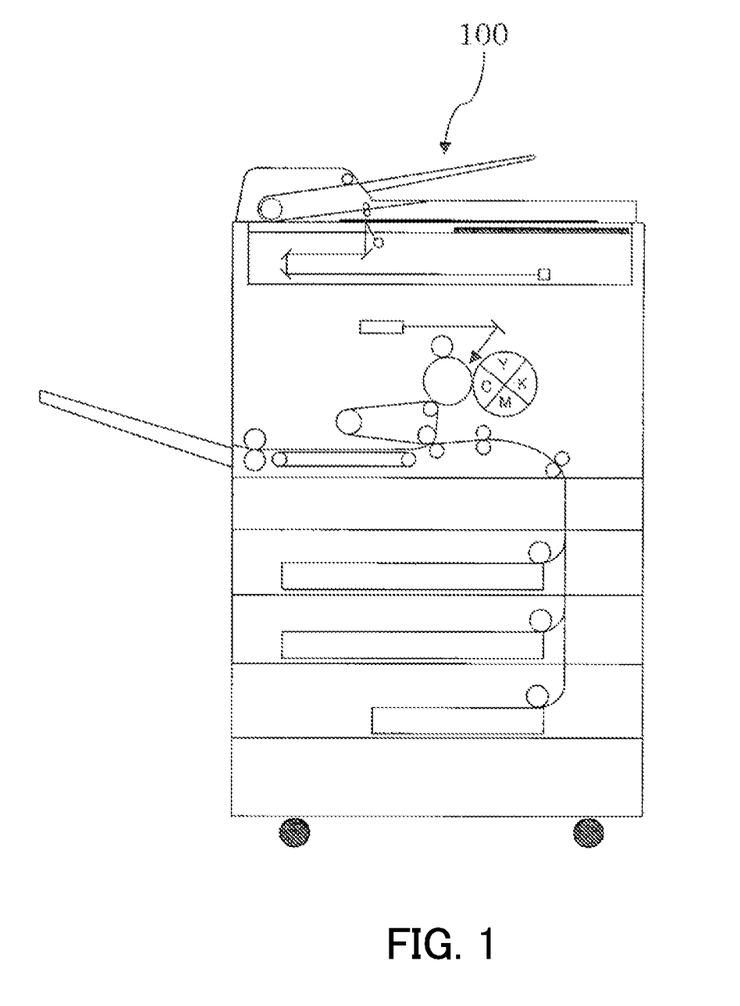
FIG. 1 is a conceptual diagram illustrating general configuration internally within a multifunction peripheral according to the present disclosure.

A multifunction peripheral 100 illustrated in FIG. 1 receives setting conditions for a printing job that are input by a user through an operation section including a touch panel. After receiving the setting conditions, the multifunction peripheral 100 drives various sections thereof such as an image reading section, an image processing section, a conveyance section, and a fixing section in order to output printed matter corresponding to the printing job. The multifunction peripheral 100 can perform color printing.

Although not illustrated in the drawings, the multifunction peripheral 100 includes a control circuit in which a central processing unit (CPU), read only memory (ROM), random access memory (RAM), a hard disk drive (HDD), and drivers corresponding to each of the aforementioned drivable sections are connected through an internal bus.

The CPU of the multifunction peripheral 100 for example uses the RAM as a work area for executing a program stored in the ROM or the HDD. The CPU exchanges data, instructions, signals, commands, or the like with the drivers based on results of executing the aforementioned program and thereby controls operation of each drivable section that is related to execution of the printing job. Note that the functions of sections of the multifunction peripheral 100 (sections illustrated in FIG. 2) other than the aforementioned drivable sections are implemented through execution of various programs by the CPU. Data and programs for implementing functions of the sections described below are stored, for example, in the ROM, the RAM, and the HDD.

Figure 2:
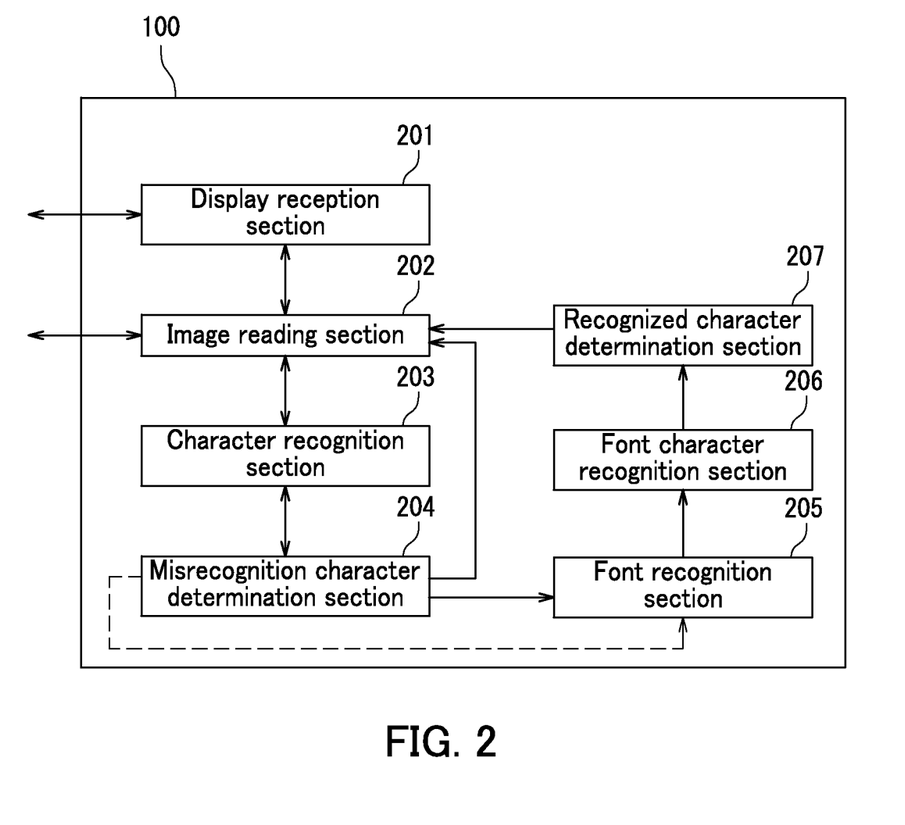
FIG. 2 is a functional block diagram of a multifunction peripheral according to an embodiment of the present disclosure.
Figure 3:
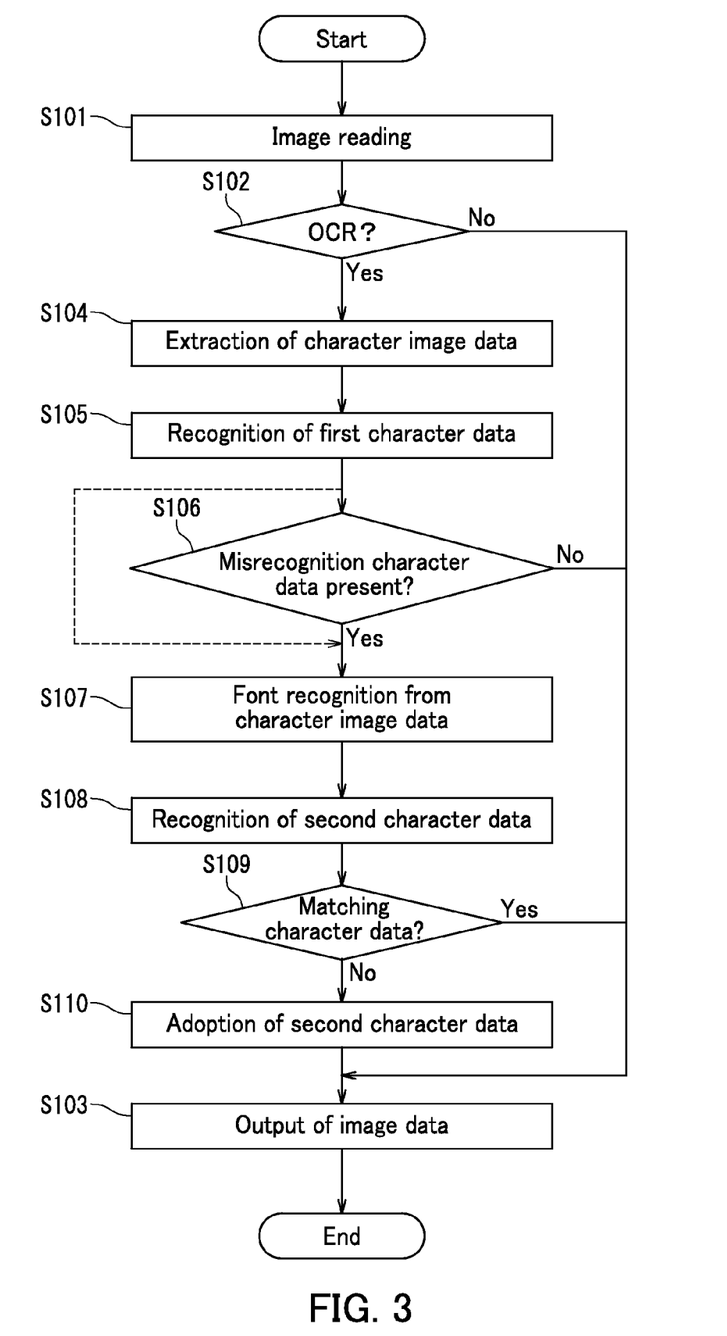
FIG. 3 is a flowchart illustrating an execution procedure for image processing according to an embodiment of the present disclosure.

The following explains configuration and execution procedure according to the embodiment of the present disclosure with reference to FIGS. 2 and 3. The multifunction peripheral 100 includes a display reception section 201, an image reading section 202, a character recognition section 203, a misrecognition character determination section 204, a font recognition section 205, a font character recognition section 206, and a recognized character determination section 207. Upon a user first turning on power to the multifunction peripheral 100, the display reception section 201 of the multifunction peripheral 100 displays an operation screen on a touch panel. The display reception section 201 receives instructions from the user through the touch panel.

In the present example, the user loads a document onto a document table while checking the operation screen. The user inputs specific setting conditions (for example, execution of an OCR function) and then selects an image reading key. The display reception section 201 receives selection of the image reading key and notifies the image reading section 202 that the image reading key has been selected. After receiving the aforementioned notification, the image reading section 202 executes reading to acquire image data corresponding to an image of the document (S101 in FIG. 3).

The image reading section 202 notifies the character recognition section 203 once the image reading section 202 has completed executing the reading. Upon receiving the aforementioned notification, the character recognition section 203 determines whether or not an execution instruction for the OCR function is included in the input setting conditions (S102 in FIG. 3).

When a result of the determination is that an execution instruction for the OCR function is not included (No for S102 in FIG. 3), the character recognition section 203 notifies the image reading section 202 that an OCR execution instruction is not included. Upon receiving the aforementioned notification, the image reading section 202 outputs the image data acquired through the reading unchanged (S103 in FIG. 3).

No particular limitations are placed on the method by which the image reading section 202 outputs the image data. For example, the image reading section 202 may display the image data on the operation section or store the image data at a destination specified by the user.

On the other hand, when the result of the determination in S102 is that an execution instruction for the OCR function is included (Yes for S102 in FIG. 3), the character recognition section 203 executes the OCR function. Through execution of the OCR function the character recognition section 203 acquires (i.e., recognizes) character data (referred to below as first character data) corresponding to character image data (i.e., image data depicting characters) among the acquired image data.

Figure 4:
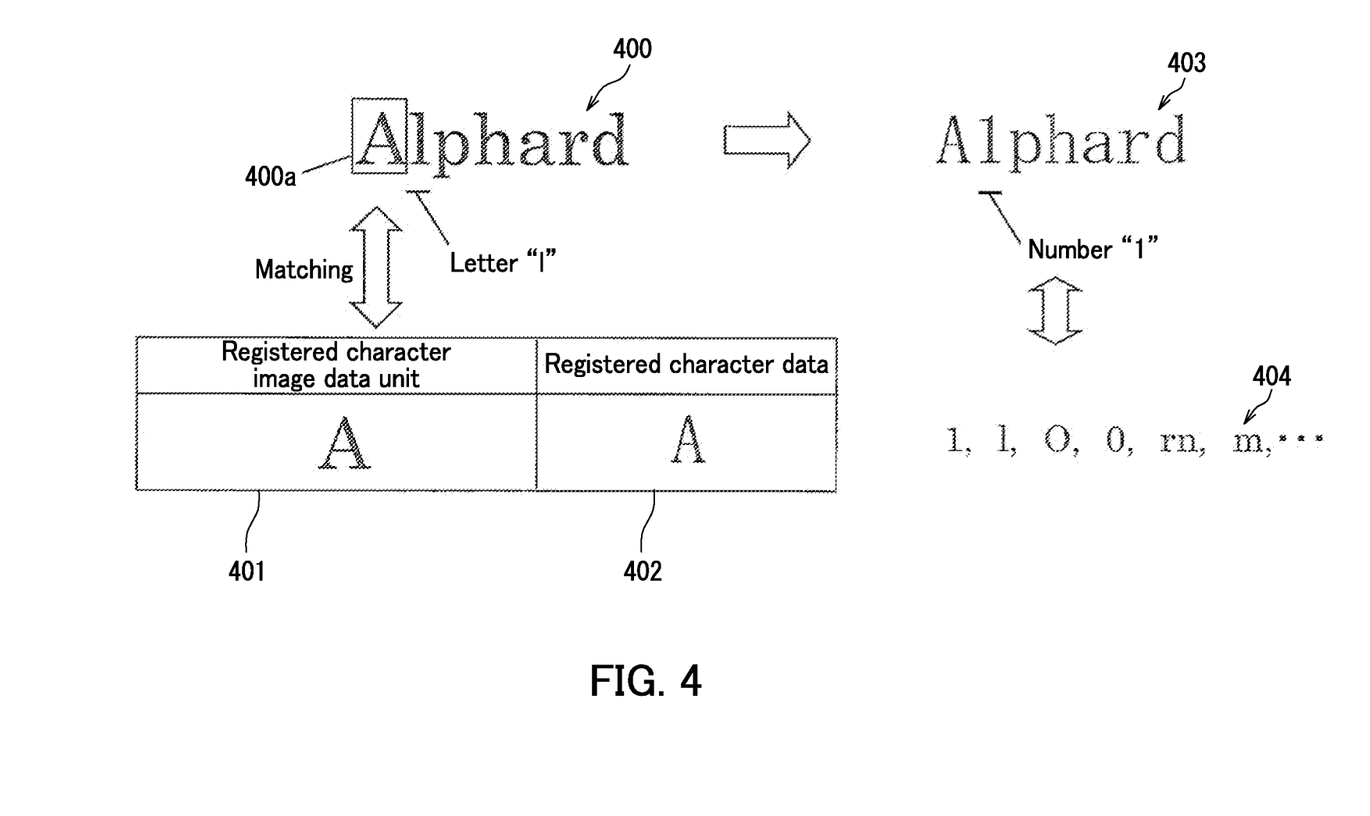
FIG. 4 illustrates an example of character recognition according to an embodiment of the present disclosure.

No particular limitations are placed on the method by which the character recognition section 203 executes the OCR function. For example, the character recognition section 203 may extract character image data 400 (for example, "Alphard") from among the image data as illustrated in FIG. 4 (S104 in FIG. 3). Next, the character recognition section 203 compares a single unit of character image data 400a (i.e., a character image data unit, e.g. "A") among the extracted character image data 400 to registered character image data units 401. The registered character image data units 401 are preset in a predetermined memory location. The character recognition section 203 determines whether or not the character image data unit 400a matches a registered character image data unit 401 (i.e., performs pattern matching). Next, the character recognition section 203 acquires (i.e., recognizes) registered character data 402 (registered character code, text data, e.g. "A") that is pre-registered as corresponding to the registered character image data unit 401 determined to match the character image data unit 400a (S105 of FIG. 3). The character recognition section 203 performs the processing described above with respect to every character image data unit 400a composing the character image data 400. As a result of the processing, the character recognition section 203 can acquire first character data 403 corresponding to the character image data 400 through character recognition.

The character recognition section 203 notifies the misrecognition character determination section 204 once the character recognition section 203 has completed execution of the OCR function. Upon receiving the aforementioned notification, the misrecognition character determination section 204 determines whether or not misrecognition character data 404 that is pre-registered as easily misrecognized character data is present in the first character data 403 acquired through character recognition (S106 in FIG. 3).

No particular limitations are placed on the method by which the misrecognition character determination section 204 performs the determination. For example, the misrecognition character determination section 204 may use misrecognition character data 404 that is pre-stored in a predetermined memory location as a reference. In the present example, the misrecognition character data 404 is character data for which there is a high tendency of misrecognition occurring during execution of the OCR function. Possible examples of the misrecognition character data 404 include the letter "l" and the number "1", the letter "O" and the number "0", and the letters "m" and the letter "m". The units of misrecognition character data 404 described above have similar character patterns (registered character data 402) to one another and thus have a high tendency to be misrecognized in execution results of the OCR function. In the example illustrated in FIG. 4, the letter "l" included in the character image data 400 is recognized through execution of the OCR function as the number "1", which is included in the first character data 403. The misrecognition character determination section 204 compares each unit of the first character data 403 acquired through character recognition to the misrecognition character data 404 used as a reference. Through the above, the misrecognition character determination section 204 determines whether or not the recognized first character data 403 includes at least one unit of misrecognition character data 404. In a situation in which the first character data 403 includes at least one unit of the misrecognition character data 404, the misrecognition character determination section 204 determines that misrecognition character data 404 is present in the first character data 403.

When a result of the determination is that the misrecognition character data 404 is not present (No for S106 in FIG. 3), the misrecognition character determination section 204 determines that misrecognition has not occurred. The misrecognition character determination section 204 notifies the image reading section 202 that misrecognition has not occurred. Upon receiving the aforementioned notification, the image reading section 202 outputs the first character data 403 acquired through character recognition in accompaniment to the image data acquired through reading (S103 in FIG. 3).

On the other hand, when the result of the determination in S106 is that the misrecognition character data 404 is present (Yes for S106 in FIG. 3), the misrecognition character determination section 204 determines that there is a possibility that misrecognition has occurred. The misrecognition character determination section 204 notifies the font recognition section 205 that misrecognition may have occurred. Upon receiving the aforementioned notification, the font recognition section 205 recognizes a font of characters depicted by character image data 400 corresponding to the misrecognition character data 404 (S107 in FIG. 3).

Figure 5:
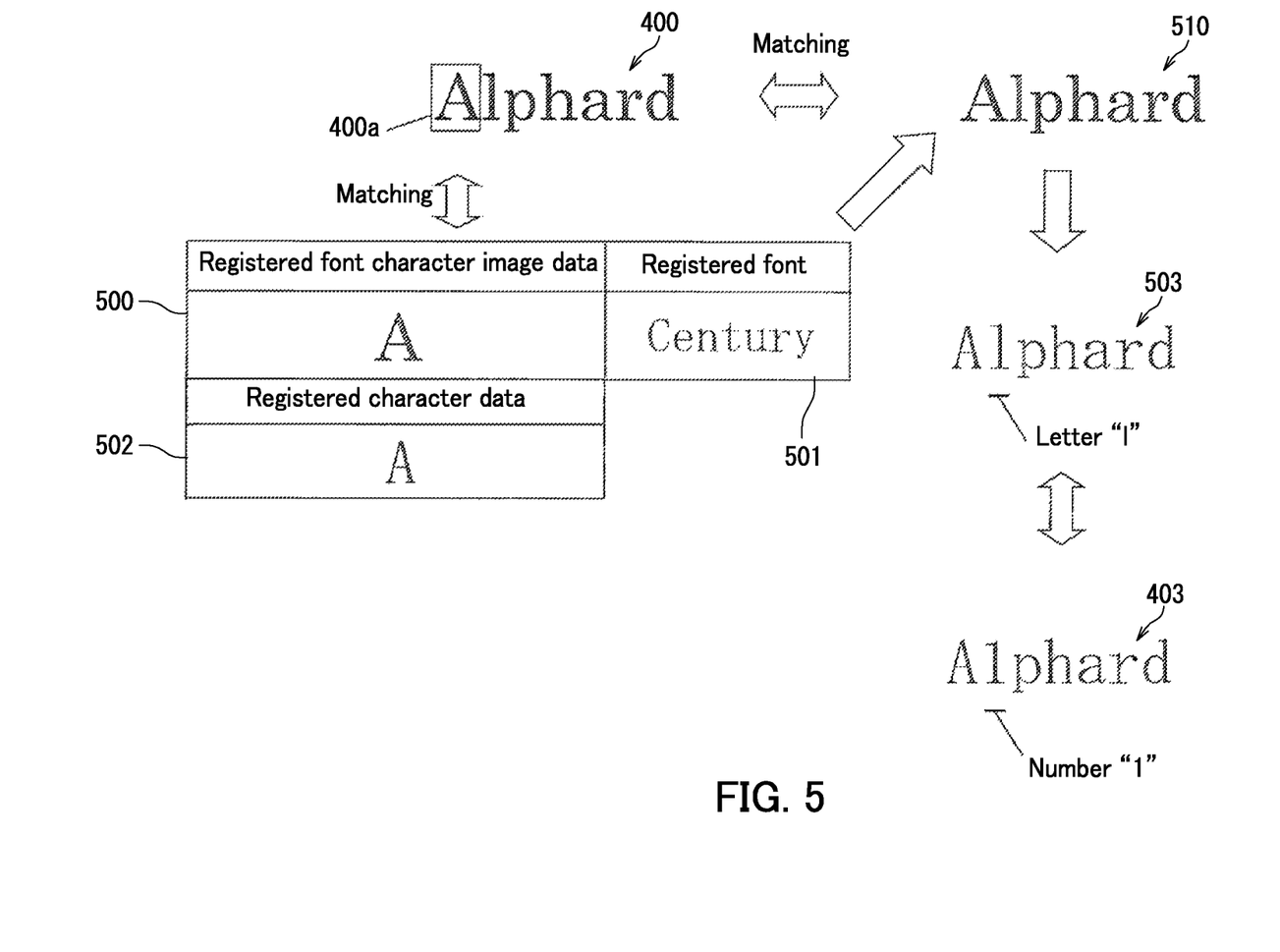
FIG. 5 illustrates an example of character recognition using a font according to an embodiment of the present disclosure.

No particular limitations are placed on the method by which the font recognition section 205 performs the recognition. The font recognition section 205 may for example, as illustrated in FIG. 5, refer to registered font character image data 500 indicating various fonts (for example, fonts such as "Century" and "Times New Roman") that is pre-stored in a predetermined memory location. The font recognition section 205 compares the character image data 400 to the registered font character image data 500 for each of the character image data units 400*a*. Through the above, the font recognition section 205 determines whether or not the character image data 400 matches the registered font character image data 500 (i.e., performs pattern matching). The font recognition section 205 then acquires (i.e., recognizes) a registered font 501 (for example, "Century") that is preset as corresponding to registered font character image data 500 that is determined to match.

During the above, a situation may for example occur in which the font recognition section 205 recognizes the registered font 501 "Century" based on a certain number of character image data units 400*a* (for example, "A" and "p") of the character image data 400 and recognizes a registered font 501 "Times New Roman" based on other character image data units 400*a* (for example, "1") of the character image data 400. In other words, as a consequence of the font recognition section 205 performing font recognition for each character image data unit 400*a* included in the character image data 400, a situation may occur in which two or more different fonts are recognized with respect to character image data 400 depicting characters composing a single word. In such a situation, the font recognition section 205 recognizes a font of the character image data 400 to be a most frequently recognized font among all fonts recognized with respect to the character image data units 400*a* included in the character image data 400. Through the above, it is possible to prevent font misrecognition based on the fact that character image data 400 for a single word is usually composed of characters represented in a single font.

The font recognition section 205 notifies the font character recognition section 206 once font recognition is complete. Upon receiving the aforementioned notification, the font character recognition section 206 compares the character image data 400 to font character image data 510 depicting characters in the recognized font ("Century"). Through the above process, the font character recognition section 206 recognizes character data (referred to below as second character data) 503 corresponding to the font character image data 510 matching the character image data 400.

No particular limitations are placed on the method by which the font character recognition section 206 performs the recognition. The font character recognition section 206 may for example, as illustrated in FIG. 5, refer to registered font character image data 500 corresponding to a registered font 501 that indicates the recognized font ("Century"). The font character recognition section 206 compares each of the character image data units 400*a* of the character image data 400 to the registered font character image data 500 used as a reference. Through the above, the font character recognition section 206 determines whether or not the aforementioned data match (i.e., performs pattern matching). The font character recognition section 206 then acquires (i.e., recognizes) registered character data 502 (for example, "A") preset as corresponding to registered font character image data 500 that is determined to match (S108 in FIG. 3). Through the above, the font character recognition section 206 can acquire character data more accurately by performing pattern matching in which comparison is performed with respect to registered font character image data 500 that corresponds in terms of font to characters depicted by the character image data 400. In other words, character misrecognition described further above can be prevented.

The font character recognition section 206 notifies the recognized character determination section 207 once recognition is complete. Upon receiving the aforementioned notification, the recognized character determination section 207 determines whether or not the first character data 403 directly recognized (i.e., acquired) from the character image data 400 matches the second character data 503 recognized using the font character image data 510 depicting characters in the aforementioned font ("Century").

No particular limitations are placed on the method by which the recognized character determination section 207 performs the determination. The recognized character determination section 207 may for example, as illustrated in FIG. 5, compare the second character data 503 recognized using the font character image data 510 depicting characters in the font "Century" to the first character data 403 directly recognized from the character image data 400 for each unit of character data. Through the above, the recognized character determination section 207 determines whether or not the aforementioned data match (i.e., performs character matching). In comparison of the second character data 503 and the first character data 403, when one or more units of character data are determined not to match, the recognized character determination section 207 determines that the first character data 403 does not match the second character data 503.

When a result of the determination is that the first character data 403 matches the second character data 503 (Yes for S109 in FIG. 3), the recognized character determination section 207 determines that misrecognition has not occurred. The recognized character determination section 207 determines that the first character data 403 is character data for which misrecognition has not occurred and notifies the image reading section 202. Upon receiving the aforementioned notification, the image reading section 202 outputs the recognized first character data 403 acquired through character recognition in accompaniment to the image data acquired through reading (S103 in FIG. 3).

On the other hand, suppose a situation such as illustrated in FIG. 5 in which the number "1" is recognized (i.e., acquired) in the first character data 403 but the letter "l" is recognized in the second character data 503, wherein there is a lower possibility of misrecognition having occurred in the second character data 503 recognized using the font character image data 510 of the font ("Century"). In such a situation in which a result of the determination in S109 is that the first character data 403 does not match the second character data 503 (No for S109 in FIG. 3), the recognized character determination section 207 determines that misrecognition has occurred. The recognized character determination section 207 sets (i.e., adopts) the second character data 503 as recognized character data for the character image data 400 (i.e., authentic character data in which misrecognition has not occurred) (S110 in FIG. 3) and notifies the image reading section 202. In other words, the recognized character determination section 207 adopts the second character data 503 in place of the first character data 403. Upon receiving the aforementioned notification, the image reading section 202 outputs the second character data 503 acquired through character recognition in accompaniment to the image data acquired through reading (S103 of FIG. 3). Through the above, when there is a possibility of misrecognition occurring during execution of the OCR function, the accuracy of character recognition can be improved by prioritizing the result of pattern matching using a font.

Furthermore, according to the present disclosure there is no need to recognize grammar or character strings of words, and thus there is no need to perform a high level of linguistic analysis. Therefore, it is possible to easily improve character recognition by adapting known pattern matching techniques and to prevent processing from becoming complicated. Furthermore, high level analysis such as mentioned above requires high cost modules, but there is no need for high-cost modules according to the present disclosure. Therefore, the present disclosure is also highly advantageous in terms of cost.

Note that the output image data may for example be used by the multifunction peripheral 100 to form an image. Although a configuration is described in the embodiment of the present disclosure in which the misrecognition character determination section 204 determines whether or not misrecognition character data 404 is present before the font recognition section 205 performs font recognition, other configurations are also possible. For example, as illustrated by dashed lines in FIGS. 2 and 3, the font recognition section 205 may perform font recognition for characters of the character image data 400 regardless of whether or not misrecognition character data 404 is present and as a result image processing may proceed directly from S105 to S107. Through the configuration described above, the accuracy of character recognition can be checked regardless of whether or not there is a possibility that misrecognition has occurred.

Although a configuration is described in the embodiment of the present disclosure in which the multifunction peripheral 100 includes the various sections, in an alternative configuration a storage medium having a program stored thereon for implementing the aforementioned sections may be provided. In such a configuration, the multifunction peripheral is caused to implement the aforementioned sections by reading the program. In the above situation, the effects of the present disclosure are achieved through the program read from the recording medium. Furthermore, the present disclosure may be practiced as a method including the steps executed by the aforementioned sections that is stored on a hard disk.

What is claimed is:

1. An image processing device comprising:
an image reading section that reads image data from a document;
a character recognition section that acquires first character data, the first character data corresponding to character image data included in the image data and indicating text data identified by a character code;
a misrecognition character determination section that determines whether or not misrecognition character data is present in the first character data, the misrecognition character data being pre-registered as easily misrecognized character data and indicating text data identified by a character code;
a font recognition section that recognizes a font of characters depicted by the character image data when the misrecognition character determination section determines that the misrecognition character data is present;
a font character recognition section that compares the character image data to font character image data depicting characters in the recognized font and acquires second character data when the font character image data matches the character image data, the second character data corresponding to the font character image data and indicating text data identified by a character code; and
a recognized character determination section that determines whether or not the first character data matches the second character data, wherein
the image reading section
outputs the first character data in accompaniment to the image data when the misrecognition character determination section determines that the misrecognition character data is not present,
outputs the second character data in accompaniment to the image data when the recognized character determination section determines that the first character data does not match the second character data, and
outputs the first character data in accompaniment to the image data when the recognized character determination section determines that the first character data matches the second character data.

2. The image processing device according to claim 1, wherein
when the font recognition section recognizes two or more fonts for characters depicted by the character image data that compose a single word as a result of performing font recognition with respect to each character depicted by the character image data, the font recognition section recognizes a most frequently recognized font among the two or more fonts as the font of the characters depicted by the character image data.

3. An image processing method comprising implementation by a processor of:
reading image data from a document;
acquiring first character data, the first character data corresponding to character image data included in the image data and indicating text data identified by a character code;
determining whether or not misrecognition character data is present in the first character data, the misrecognition character data being pre-registered as easily misrecognized character data and indicating text data identified by a character code;
recognizing a font of characters depicted by the character image data when determining that the misrecognition character data is present in the first character data;
comparing the character image data to font character image data depicting characters in the recognized font and acquiring second character data when the font character image data matches the character image data, the second character data corresponding to the font character image data and indicating text data identified by a character code;
determining whether or not the first character data matches the second character data;
outputting the first character data in accompaniment to the image data when determining that the misrecognition character data is not present in the first character data;
outputting the second character data in accompaniment to the image data when determining that the first character data does not match the second character data; and outputting the first character data in accompaniment to the image data when determining that the first character data matches the second character data.

\* \* \* \* \*